US012500050B2

United States Patent
Weng et al.

(10) Patent No.: US 12,500,050 B2
(45) Date of Patent: Dec. 16, 2025

(54) KEYBOARD DEVICE

(71) Applicant: Chicony Electronics Co., Ltd., New Taipei (TW)

(72) Inventors: Shin-Chin Weng, New Taipei (TW); Chih-Ping Lin, New Taipei (TW); Shih-Yu Hsu, New Taipei (TW); Liang-Chun Yeh, New Taipei (TW); Bo-Wei Su, New Taipei (TW)

(73) Assignee: CHICONY ELECTRONICS CO., LTD., New Taipei (TW)

( * ) Notice: Subject to any disclaimer, the term of this patent is extended or adjusted under 35 U.S.C. 154(b) by 286 days.

(21) Appl. No.: 18/347,410

(22) Filed: Jul. 5, 2023

(65) Prior Publication Data

US 2024/0029970 A1    Jan. 25, 2024

(30) Foreign Application Priority Data

Jul. 22, 2022   (TW) .................... 111127654

(51) Int. Cl.
*H01H 13/7073*    (2006.01)
*H01H 13/18*    (2006.01)
*H01H 3/12*    (2006.01)

(52) U.S. Cl.
CPC ...... *H01H 13/7073* (2013.01); *H01H 13/186* (2013.01); *H01H 3/125* (2013.01); *H01H 2215/032* (2013.01); *H01H 2231/002* (2013.01)

(58) Field of Classification Search
CPC .. H01H 13/7073; H01H 13/186; H01H 3/125; H01H 2215/032; H01H 2231/002; H01H 2221/058; H01H 2221/062; H01H 13/7065; H01H 13/18; H01H 3/12
See application file for complete search history.

(56) References Cited

U.S. PATENT DOCUMENTS

| | | | |
|---|---|---|---|
| 6,444,933 B1 * | 9/2002 | Chun | H01H 3/125 200/344 |
| 10,879,021 B2 | 12/2020 | Lu et al. | |
| 11,456,128 B1 * | 9/2022 | Chang | H01H 13/14 |

FOREIGN PATENT DOCUMENTS

TW    I677892 B    11/2019

* cited by examiner

*Primary Examiner* — Lheiren Mae A Caroc
(74) *Attorney, Agent, or Firm* — MUNCY, GEISSLER, OLDS & LOWE, P.C.

(57) ABSTRACT

A keyboard device includes a substrate, a keycap, a first connection member, and a first elastic arm structure. The substrate has a top surface, and the top surface has an assembling region. The keycap is disposed above the assembling region, and the keycap has a bottom surface facing the assembling region. The first connection member is connected between the keycap and the assembling region, the first connection member includes a first assembly side and a second assembly side opposite to the first assembly side, the first assembly side is pivotally connected to the bottom surface of the keycap, and the second assembly side is pivotally connected to the substrate. The first elastic arm structure includes a connection end and a free end opposite to the connection end, the connection end is connected to the first assembly side, and the free end abuts against the bottom surface of the keycap.

12 Claims, 12 Drawing Sheets

KEYBOARD DEVICE

CROSS-REFERENCE TO RELATED APPLICATION

This non-provisional application claims priority under 35 U.S.C. § 119(a) to Patent Application No. 111127654 filed in Taiwan, R.O.C. on Jul. 22, 2022, the entire contents of which are hereby incorporated by reference.

BACKGROUND

Technical Field

The instant disclosure relates to an input device, in particular, to a keyboard device.

Related Art

Keyboards are common input devices. Usually, they are used along with daily computer products (such as laptops, notebook computers, smart phones, or tablets), industrial scaled control equipment, or processing equipment for operation or text inputs.

SUMMARY

In general, a keyboard known to the inventor(s) includes a bottom board, a plurality of keycaps disposed on the bottom board, and a plurality of connection members each disposed between a corresponding one of the keycaps and the bottom board. The top portion of the connection member is pivotally connected to the keycap such that the connection member is rotatable with respect to the keycap, and the bottom portion of the connection member is pivotally connected to the bottom board such that the connection member is rotatable with respect to the bottom board. Therefore, gaps thus exist between the top portion of the connection member and the keycap and between the bottom portion of the connection member and the bottom board. As a result, when sounds with certain frequencies exists in the circumstance where the keyboard is used (for example, the user plays music with a speaker to generate certain sounds), the components of the keyboard resonate with the certain frequency. Therefore, because of the gaps between the top portion of the connection member and the keycap and between the bottom portion of the connection member and the bottom board, collisions between the keycaps and the connection members and between the bottom board and the connection members occur, thus producing noises.

In view of this, in one embodiment, a keyboard device is provided. The keyboard device comprises a substrate, a keycap, a first connection member, and a first elastic arm structure. The substrate has a top surface, and the top surface has an assembling region. The keycap is disposed above the assembling region, and the keycap has a bottom surface facing the assembling region. The first connection member is connected between the keycap and the assembling region, the first connection member comprises a first assembly side and a second assembly side opposite to the first assembly side, the first assembly side is pivotally connected to the bottom surface of the keycap, and the second assembly side is pivotally connected to the substrate. The first elastic arm structure comprises a connection end and a free end opposite to the connection end, the connection end is connected to the first assembly side, and the free end abuts against the bottom surface of the keycap.

In another embodiment, a keyboard device is provided. The keyboard device comprises a substrate, a keycap, a first connection member, and a first elastic arm member. The substrate has a top surface, and the top surface has an assembling region. The keycap is disposed above the assembling region, and the keycap has a bottom surface facing the assembling region. The first connection member is connected between the keycap and the assembling region, the first connection member comprises a first assembly side and a second assembly side opposite to the first assembly side, the first assembly side is pivotally connected to the bottom surface of the keycap, and the second assembly side is pivotally connected to the substrate. The first elastic arm member comprises a connection portion and a free portion opposite to the connection portion, the connection portion is connected to the second assembly side, and the free portion abuts against the top surface of the substrate.

Based on the above, in the keyboard device according to one or some embodiments of the instant disclosure, the first elastic arm structure is connected to the first assembly side of the first connection member and the free end of the first elastic arm structure abuts against the bottom surface of the keycap, or the first elastic arm member is connected to the second assembly side of the first connection member and the free portion of the first elastic arm member abuts against the top surface of the substrate. Therefore, when sounds with certain frequencies exists in the circumstance where the keyboard device is used (for example, the user plays music with a speaker to generate certain sounds), the first elastic arm structure or the first elastic arm member can eliminate or greatly reduce the wobbling of the components, thereby effectively reducing the noises generated by the resonance. Furthermore, upon the user presses the keycap, the keycap and the first connection member can be moved much more stably.

BRIEF DESCRIPTION OF THE DRAWINGS

The disclosure will become more fully understood from the detailed description given herein below for illustration only, and thus not limitative of the disclosure, wherein.

DETAILED DESCRIPTION

It is noted that, the embodiments, the terms "first", "second", "third", and "fourth" are provided to describe different elements, and these elements are not thus limited by using these terms. Furthermore, in all the figures, the same reference numbers refer to identical or similar elements.

Figure 1:
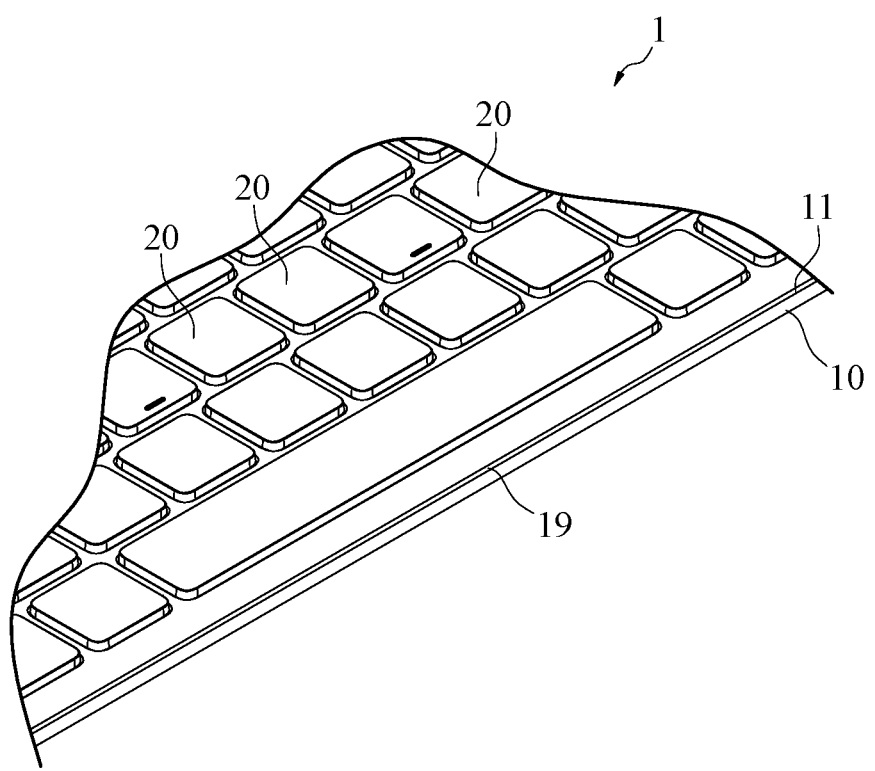
FIG. 1 illustrates a partial perspective view of a keyboard device according to a first embodiment of the instant disclosure.
Figure 2:
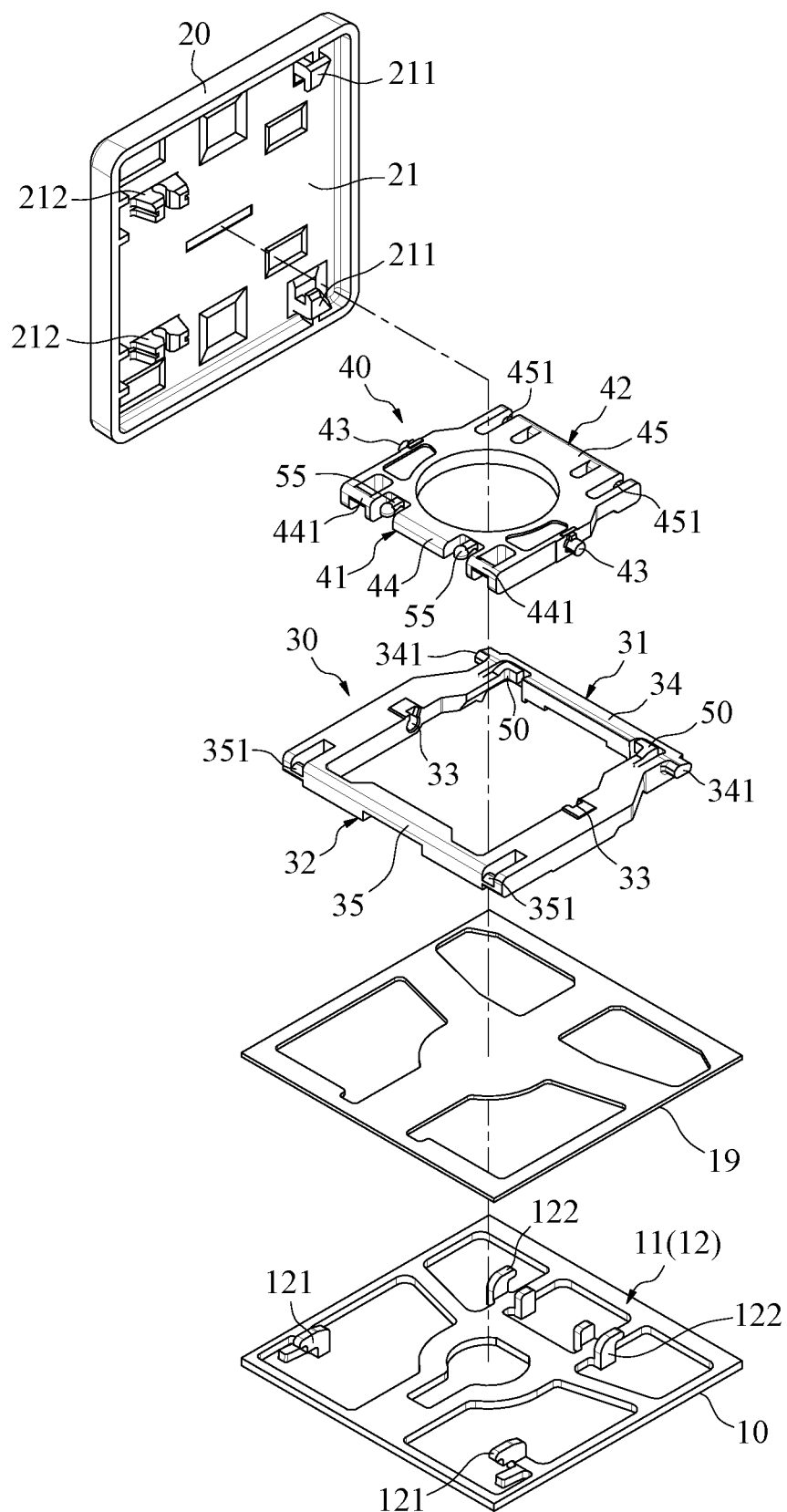
FIG. 2 illustrates a partial exploded view of the keyboard device of the first embodiment.
Figure 3:
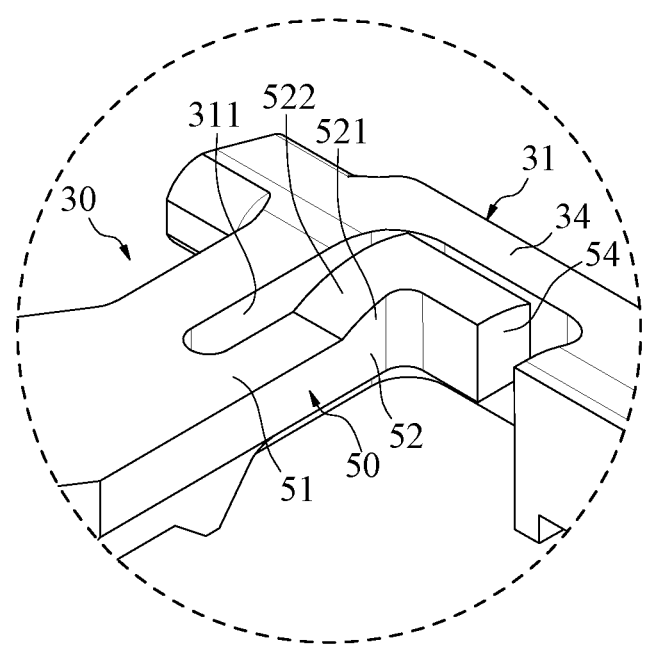
FIG. 3 illustrates an enlarged partial view of the keyboard device shown in FIG. 2.
Figure 4:
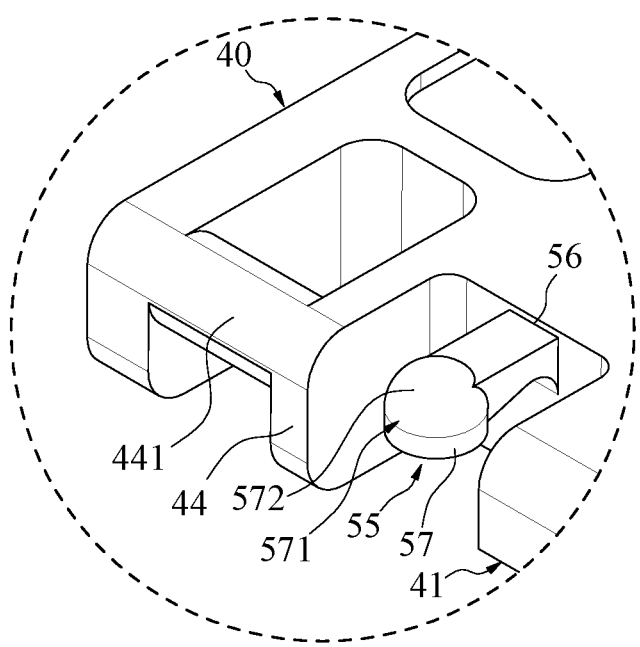
FIG. 4 illustrates another enlarged partial view of the keyboard device shown in FIG. 2.

FIG. 1 illustrates a partial perspective view of a keyboard device according to a first embodiment of the instant disclosure. FIG. 2 illustrates a partial exploded view of the keyboard device of the first embodiment. FIG. 3 illustrates an enlarged partial view of the keyboard device shown in FIG. 2. FIG. 4 illustrates another enlarged partial view of the keyboard device shown in FIG. 2. As shown in FIG. 1 and FIG. 2, in this embodiment, the keyboard device 1 comprises a substrate 10, a keycap 20, a first connection member 30, a second connection member 40, and a first elastic arm structure 50. The keyboard device 1 may be utilized for various electronic devices (e.g., as the input devices of laptop computers, notebook computers, or other electronic devices), and users can operate the keyboard device 1 to generate corresponding signal(s).

As shown in FIG. 1 and FIG. 2, in this embodiment, the number of the keycap 20 may be plural. The keycaps 20 may be, for example, the keycaps of the Caps Lock key, the Shift key, the Ctrl key, the Enter key, the Backspace key, or the like. The substrate 10 may be a rigid plate made of metal (e.g., iron, aluminum, and alloy) or plastic material and capable of supporting components. The substrate 10 has a top surface 11, and the top surface 11 has assembling regions 12 for assembling the keycaps 20. In other words, in this embodiment, the assembling regions 12 are regions on the substrate 10 for being correspondingly assembled with the keycaps 20 (for example, the rectangular region shown in FIG. 2).

As shown in FIG. 2, take one of the assembling regions 12 as an example, the assembling region 12 of the substrate 10 is provided with at least one first assembling member 121 and at least one second assembling member 122 for being assembled with the first connection member 30 and the second connection member 40, respectively. In this embodiment, the number of the first assembling member 121 is two, and the two first assembling members 121 are separated from each other and adjacent to one of two sides of the assembling region 12. Likewise, in this embodiment, the number of the second assembling member 122 is two, and the two second assembling members 122 are separated from each other and adjacent to the other side of the assembling region 12.

In some embodiments, the first assembling member 121 and the second assembling member 122 are hook structures integrally and upwardly extend from the substrate 10 (in this embodiment, the first assembling member 121 and the second assembling member 122 are L-shaped, but may be U-shaped, T-shaped, or of other shapes). In some embodiments, the first assembling member 121 and the second assembling member 122 are individual components and assembled on the assembling region 12 of the substrate 10.

As shown in FIG. 2, the keycap 20 is disposed above the assembling region 12, and the keycap 20 has a bottom surface facing the assembling region 12. In this embodiment, the bottom surface 21 of the keycap 20 is provided with at least one first pivot base 211 and at least one second pivot base 212 for being assembled with the first connection member 30 and the second connection member 40, respectively. In this embodiment, the number of the first pivot base 211 is two, and the two first pivot bases 211 are separated from each other and adjacent to one of two sides of the bottom surface 21. Likewise, in this embodiment, the number of the second pivot base 212 is two, and the two second pivot bases 212 are separated from each other and adjacent to the bottom surface 21.

Moreover, as shown in FIG. 1 and FIG. 2, a circuit board 19 may be disposed on the substrate 10. The first connection member 30 and the second connection member 40 are movably connected between the keycap 20 and the assembling region 12. Therefore, when the keycap 20 is pressed, the first connection member 30 and the second connection member 40 can be moved with respect to the keycap 20, so that the first connection member 30 and the second connection member 40 guide the keycap 20 to move downwardly toward the substrate 10 to press the resilient member (not shown) so as to trigger the circuit board 19 to generate corresponding signal(s). When the keycap 20 is released, the keycap 20 is moved back to its original position (a position that the keycap 20 is not pressed) by using the elastic force stored in the resilient member.

In some embodiments, the circuit board 19 may be a printed circuit board (PCB), a membrane circuit board, a flexible print circuit board (FPCB), a rigid-flex PCB, or the like. The resilient member may be a rubber dome, a metal dome, a spring, an elastic piece, or other elastic components. The resilient member is capable of storing elastic forces when being pressed.

As shown in FIG. 2, the first connection member 30 comprises a first assembly side 31 and a second assembly side 32 opposite to the first assembly side 31. The first assembly side 31 is nearer to the keycap 20 as compared with the second assembly side 32 (in other words, in this embodiment, a distance between the first assembly side 31 and the keycap 20 is less than a distance between the second assembly side 32 and the keycap 20). The first assembly side 31 is pivotally connected to the bottom surface 21 of the keycap 20, and the second assembly side 32 is pivotally connected to the substrate 10. In this embodiment, the first connection member 30 is a frame (here, a rectangular frame), the first assembly side 31 has a first connection arm 34, and the first connection arm 34 is provided with two first shafts 341. The two first shafts 341 are respectively at two opposite ends of the first connection arm 34 and pivotally connected to the two first pivot bases 211 on the bottom surface 21 of the keycap 20, so that the first assembly side 31 is rotatable with respect to the keycap 20. The second assembly side 32 of the first connection member 30 has a second connection arm 35, and the second connection arm 35 is provided with two second shafts 351. The two second shafts 351 are respectively at two opposite ends of the second connection arm 35 and pivotally connected to the two first assembling members 121 of the substrate 10, so that the second assembly side 32 is rotatable with respect to the substrate 10.

As shown in FIG. 2, the second connection member 40 comprises a third assembly side 41 and a fourth assembly side 42 opposite to the third assembly side 41. The third assembly side 41 is nearer to the keycap 20 as compared with the fourth assembly side 42 (in other words, in this embodiment, a distance between the third assembly side 41 and the keycap 20 is less than a distance between the fourth assembly side 42 and the keycap 20). The third assembly side 41 is pivotally connected to the bottom surface 21 of the keycap 20, and the fourth assembly side 42 is pivotally connected to the substrate 10. In this embodiment, likewise, the second connection member 40 is a frame (here, a rectangular frame), the third assembly side 41 has a third connection arm 44, and the third connection arm 44 is provided with two third shafts 441. The two third shafts 441 are respectively at two opposite ends of the third connection arm 44 and pivotally connected to the two second pivot bases 212 on the bottom surface 21 of the keycap 20, so that the third assembly side 41 is rotatable with respect to the keycap 20. The fourth assembly side 42 of the second connection member 40 has a fourth connection arm 45, and the fourth connection arm 45 is provided with two fourth shafts 451. The two fourth shafts 451 are respectively at two opposite ends of the fourth connection arm 45 and pivotally connected to the two second assembling members 122 of the substrate 10, so that the fourth assembly side 42 is rotatable with respect to the substrate 10.

As shown in FIG. 2, in this embodiment, the size of the first connection member 30 is greater than the size of the second connection member 40, so that the first connection member 30 can be fitted over the second connection member 40. Moreover, a first pivoting member 33 is between the first assembly side 31 and the second assembly side 32 of the first connection member 30, a second pivoting member 43 is between the third assembly side 41 and the fourth assembly side 42 of the second connection member 40, the second pivoting member 43 is pivotally connected to the first pivoting member 33, so that the first connection member 30 and the second connection member 40 are assembled with each other to form a scissor type connection member, and the first connection member 30 and the second connection member 40 are rotatable with respect to each other.

In some embodiments, one of the first pivoting member 33 and the second pivoting member 43 is a pivot shaft, the other one is a groove, and the pivot shaft can be inserted into the groove, so that the first pivoting member 33 and the second pivoting member 43 are pivotally connected with each other. Moreover, the size of the second connection member 40 may be greater than the size of the first connection member 30, so that the second connection member 40 can be fitted over the first connection member 30, but the instant disclosure is not limited thereto.

It is understood that the embodiments mentioned above are provided for illustrative purposes. In some embodiments, the first connection member 30 and the second connection member 40 are individually connected between the keycap 20 and the substrate 10. For example, the first connection member 30 and the second connection member 40 are arranged parallel or symmetrically. For instance, the first connection member 30 and the second connection member 40 may be arranged in a line-symmetry manner by taking the central axis of the keycap 20 as a virtual symmetry line, and the first connection member 30 and the second connection member 40 are together form a A profile, a V profile, or a butterfly profile, depending on the inclining directions of the first connection member 30 and the second connection member 40.

As shown in FIG. 2 to FIG. 4, the number of the first elastic arm structure 50 is one or more and the first elastic arm structure 50 is disposed on the first assembly side 31 of the first connection member 30 and thus abuts against the bottom surface 21 of the keycap 20. Moreover, the third assembly side 41 of the second connection member 40 may be provided with at least one second elastic arm structure 55 to abut against the bottom surface 21 of the keycap 20.

As shown in FIG. 2 to FIG. 4, in this embodiment, the keyboard device 1 comprises two first elastic arm structures 50 and two second elastic arm structures 55, the two first elastic arm structures 50 are respectively adjacent to two opposite ends of the first connection arm 34, and the two second elastic arm structures 55 are respectively adjacent to two opposite ends of the second connection arm 44. Take one of the first elastic arm structures 50 and the second elastic arm structures 55 as an example. The first elastic arm structure 50 is an elastic arm and comprises a connection end 51 and a free end 52 opposite to the connection end 51, and the first connection end 51 of the first elastic arm structure 50 is connected to the first assembly side 31 of the first connection member 30. The second elastic arm structure 55 is an elastic arm and comprises a connection end 56 and a free end 57 opposite to the connection end 56, and the connection end 56 is connected to the third assembly side 41 of the second connection member 40. When an external force is applied to the free end 52 of the first elastic arm structure 50 and the free end 57 of the second elastic arm structure 55, the free end 52 of the first elastic arm structure 50 and the free end 57 of the second elastic arm structure 55 can be moved freely, so that the first elastic arm structure 50 and the second elastic arm structure 55 are deformed. When the external force is relieved, the first elastic arm structure 50 and the second elastic arm structure 55 are recovered to the unforced condition (recovered to the condition that the first elastic arm structure 50 and the second elastic arm structure 55 are not deformed).

Furthermore, as shown in FIG. 2 to FIG. 4, in this embodiment, when an external force is applied to the free end 52 of the first elastic arm structure 50, the first elastic arm structure 50 swings by taking the connection end 51 as a swinging axis, and the first elastic arm structure 50 is thus deformed; when the external force is relieved, the first elastic arm structure 50 swings resiliently by taking the connection end 51 as the swinging axis, and the first elastic arm structure 50 is recovered to the unforced condition. Likewise, when an external force is applied to the free end 57 of the second elastic arm structure 55, the second elastic arm structure 550 swings by taking the connection end 56 as a swinging axis, and the second elastic arm structure 55 is thus deformed; when the external force is relieved, the second elastic arm structure 55 swings resiliently by taking the connection end 56 as the swinging axis, and the second elastic arm structure 55 is recovered to the unforced condition.

As shown in FIG. 2 to FIG. 4, in this embodiment, the connection end 51 of the first elastic arm structure 50 is integrally connected to the first assembly side 31 of the first connection member 30. In other words, the first elastic arm structure 50 and the first connection member 30 may be a structure integrally formed as a one-piece member, so that the manufacturing costs and numbers of the manufacturing steps of the keyboard device 1 can be reduced. Furthermore, as shown in FIG. 3, in this embodiment, the first assembly side 31 of the first connection member 30 has a groove 311, and the first elastic arm structure 50 is in the groove 311, so that the usage amount of the material of the first connection member 30 can be further reduced. Moreover, the second elastic arm structure 55 and the second connection member 40 may be a structure integrally formed as a one-piece member and the descriptions are not repeated here.

It is understood that the embodiments mentioned above are provided for illustrative purposes. In some embodiments, the first elastic arm structure 50 may be an individual element and assembled to the first connection member 30, and the second elastic arm structure 55 may be an individual element and assembled to the second connection member 40. Moreover, the first elastic arm structure 50 may be disposed on other portions of the first connection member 30 depending on actual product requirements, and the second elastic arm structure 55 may be disposed on other portions of the second connection member 40 depending on actual product requirements.

Figure 5:
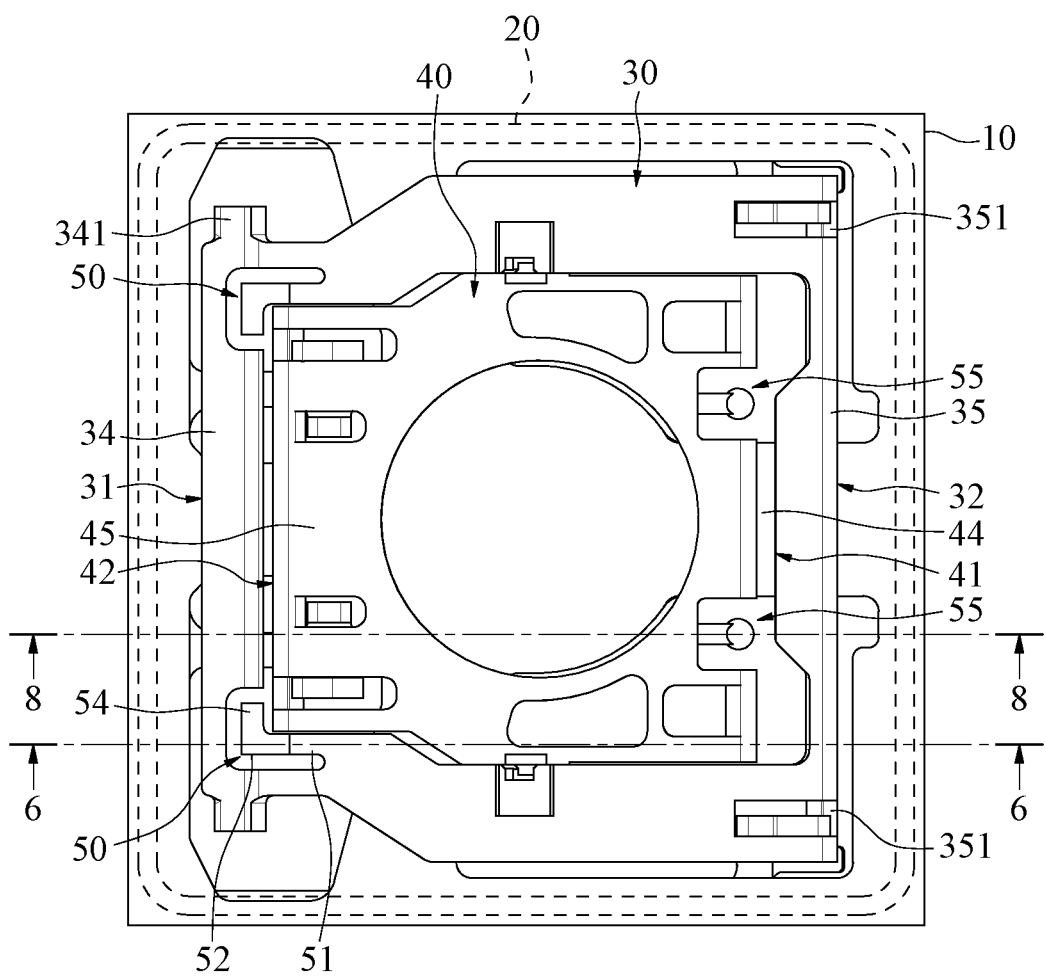
FIG. 5 illustrates a plan view of the keyboard device of the first embodiment.
Figure 6:
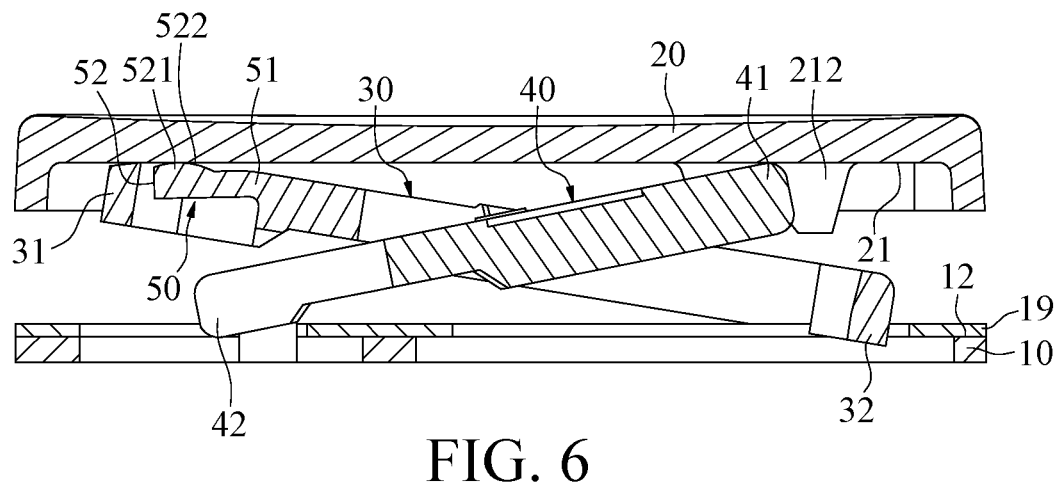
FIG. 6 illustrates a cross-sectional view along the line 6-6 shown in FIG. 5.

As shown in FIG. 3, when the first assembly side 31 of the first connection member 30 is not assembled to the keycap 20, the free end 52 of the first elastic arm structure 50 protrudes out of the surface of the first connection member 30, and the height position of the free end 52 is greater than the height position of the first assembly side 31. Therefore, as shown in FIG. 5 and FIG. 6, when the first assembly side 31 of the first connection member 30 is assembled to the keycap 20, the free end 52 of each of the first elastic arm structures 50 continuously abuts against the bottom surface 21 of the keycap 20. Therefore, when sounds with certain frequencies exists in the circumstance where the keyboard device 1 is used (for example, the user plays music with a speaker to generate certain sounds) and the components of the keyboard device 1 resonate with the certain frequency, the first elastic arm structure 50 can prevent the collision between the keycap 20 and the first connection member 30 caused by the gaps therebetween. Therefore, the wobbling of the components can be eliminated or greatly reduced, thereby effectively reducing the noises generated by the resonance.

Figure 7:
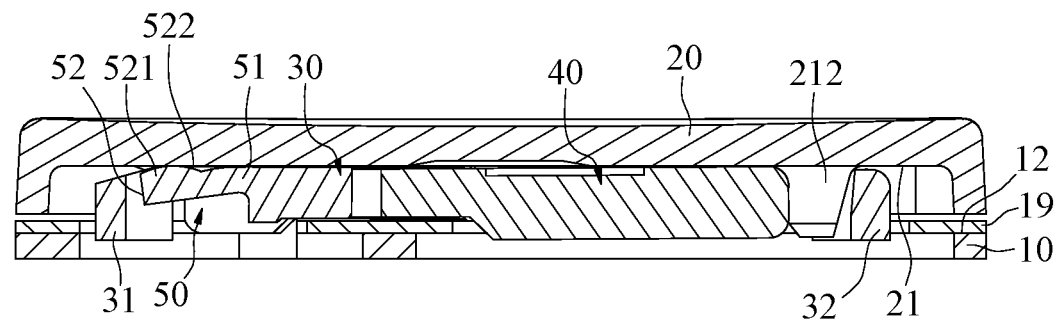
FIG. 7 illustrates a schematic view showing the pressing operation of the keyboard device shown in FIG. 6.

Furthermore, when the keycap 20 is moved with respect to the substrate 10 and moved at different height positions, the free end 52 of the first elastic arm structure 50 continuously abuts against the keycap 20 to prevent the wobbling of the first elastic arm structure 50. Therefore, during the operation of the keyboard device 1, the keycap 20 and the first connection member 30 can be moved much more stably. As shown in FIG. 6, when the keycap 20 is not pressed and thus at a first height position, the free end 52 of the first elastic arm structure 50 elastically abuts against the bottom surface 21 of the keycap 20, so that the first elastic arm structure 50 is slightly deformed or imperceptibly deformed (that is, in this embodiment, the first elastic arm structure 50 is in the unforced condition) and is arranged by a first inclined angle. Furthermore, as shown in FIG. 7, when an external force is applied to the keycap 20 (for example, when the user presses the keycap 20) and moved downwardly and toward the substrate 10, and the keycap 20 is thus at the second height position, the keycap 20 abuts against the free end 52 of the first elastic arm structure 50 during the downward movement of the keycap 20. Therefore, the first elastic arm structure 50 swings by taking the connection end 51 as the swinging axis and the first elastic arm structure 50 is deformed, so that the first elastic arm structure 50 is now arranged by a second inclination angle (in this embodiment, the second inclination angle is greater than the first inclination angle) and continuously abuts against the bottom surface 21 of the keycap 20. Moreover, when the keycap 20 is released and thus the external force is relieved, the keycap 20 is moved upwardly and moved resiliently to the first height position (the unpressed position), so that the first elastic arm structure 50 is recovered to the condition that is slightly deformed or imperceptibly deformed.

Figure 8:
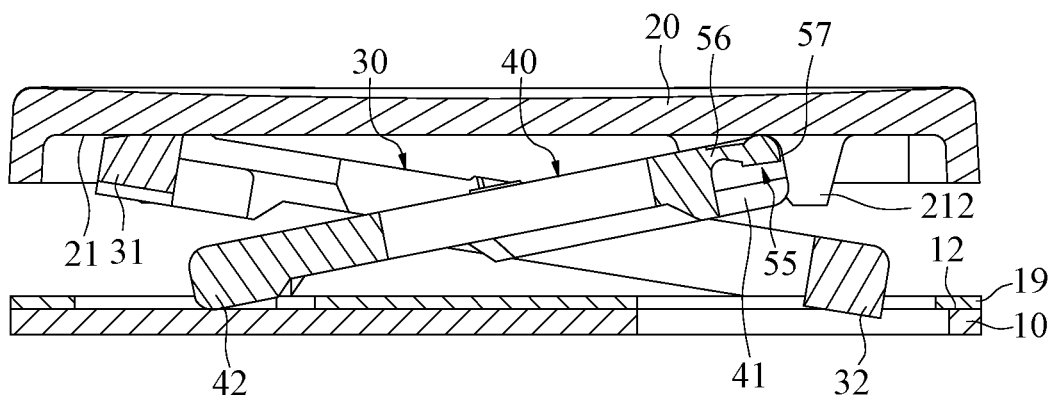
FIG. 8 illustrates a cross-sectional view along the line 8-8 shown in FIG. 5.
Figure 9:
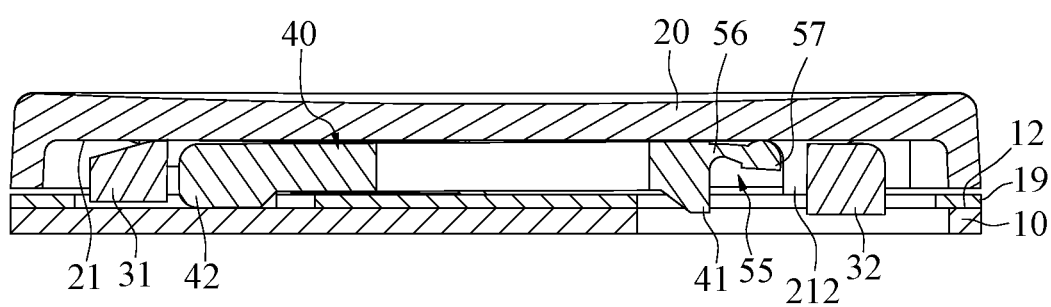
FIG. 9 illustrates a schematic view showing the pressing operation of the keyboard device shown in FIG. 8.

As shown in FIG. 4, when the third assembly side 41 of the second connection member 40 is not assembled to the keycap 20, the free end 57 of the second elastic arm structure 55 protrudes out of the surface of the second connection member 40, and the height position of the free end 57 is greater than the height position of the third assembly side 41. Therefore, as shown in FIG. 8 and FIG. 9, likewise, when the third assembly side 41 of the second connection member 40 is assembled to the keycap 20, the free end 57 of each of the second elastic arm structures 55 continuously abuts against the bottom surface 21 of the keycap 20. Therefore, when sounds with certain frequencies exists in the circumstance where the keyboard device 1 is used (for example, the user plays music with a speaker to generate certain sounds) and the components of the keyboard device 1 resonate with the certain frequency, the second elastic arm structure 55 can prevent the collision between the keycap 20 and the second connection member 40 caused by the gaps therebetween. Therefore, the wobbling of the components can be eliminated or greatly reduced, thereby effectively reducing the noises generated by the resonance.

Furthermore, as shown in FIG. 8 and FIG. 9, when the keycap 20 is moved with respect to the substrate 10 and moved at different height positions, the free end 57 of the second elastic arm structure 55 continuously abuts against the keycap 20 to prevent the wobbling of the second elastic arm structure 55. Therefore, during the operation of the keyboard device 1, the keycap 20 and the second connection member 40 can be moved much more stably. Moreover, through respectively configuring the first elastic arm structure 50 on the first assembly side 31 of the first connection member 30 and configuring the second elastic arm structure 55 on the third assembly side of the second connection member 40, the force applied to the keycap can be much more uniformly, thereby reducing the possibility of the keycap 20 to be deflected or tilted.

In some embodiments, the structure of the first elastic arm structure 50 and the structure of the second elastic arm structure 55 may be the same or different from each other, the structures of the two first elastic arm structures 50 may be the same or different from each other, and the structures of the two second elastic arm structures 55 may be the same or different from each other. For example, each of the first elastic arm structures 50 and each of the second elastic arm structures 55 may be one of the following embodiments. As shown in FIG. 3, FIG. 6, and FIG. 7, the free end 52 of the first elastic arm structure 50 is further provided with a protrusion 521, the protrusion 521 has a curved surface 522, and the curved surface 522 abuts against the bottom surface 21 of the keycap 20. Therefore, during that the keycap 20 is moved downward or upward to be at different height positions to allow the swinging of the first elastic arm structure 50, through the configuration of the curved surface 522 of the protrusion 521, the friction between the bottom surface 21 of the keycap 20 and the first elastic arm structure 50 can be effectively reduced, thereby reducing the resistance generated upon the user presses the keycap 20.

In some embodiments, the contact between the free end 52 of the first elastic arm structure 50 and the bottom surface 21 of the keycap 20 may be in a point-contact manner, a line-contact manner, or a surface-contact manner. For example, as shown in FIG. 3 and FIG. 6, in this embodiment, the curved surface 522 of the protrusion 521 of the free end 52 is an arced surface. Therefore, when the curved surface 522 abuts against the bottom surface 21 of the keycap 20, the contact between the curved surface 522 and the bottom surface 21 is in a line-contact manner.

Figure 10:
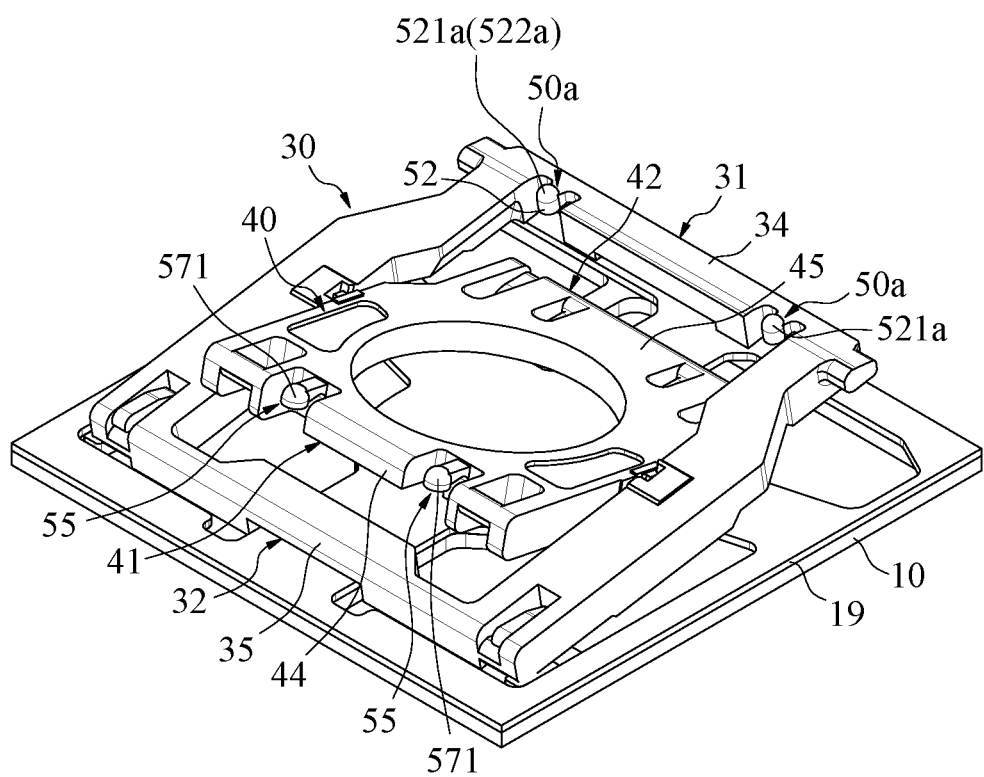
FIG. 10 illustrates a partial perspective view of a keyboard device according to a second embodiment of the instant disclosure.

Alternatively, as shown in FIG. 10, which illustrates a partial perspective view of a keyboard device according to a second embodiment of the instant disclosure. The difference between the embodiment shown in FIG. 10 and the embodiment shown in FIG. 6 is at least that, in this embodiment, the curved surface 522a of the protrusion 521a on the free end 52 of the first elastic arm structure 50a is a semispherical surface. Therefore, when the top portion of the curved surface 522a abuts against the bottom surface 21 of the keycap 20, the contact between the curved surface 522a and the bottom surface 21 is in a point-contact manner. Hence, the point-contact configuration further reduces the friction between the bottom surface 21 of the keycap 20 and the first elastic arm structure 50a, thereby further reducing the resistance generated upon the user presses the keycap 20.

It is understood that the embodiments mentioned above are provided for illustrative purposes. In some embodiments, the protrusion 521 on the free end 52 of the first elastic arm structure 50 may be a cone structure, a ball structure, a cylinder structure, or an elongated rib structure, so that the protrusion 521 can contact the bottom surface 21 of the keycap 20 in different contact manners.

As shown in FIG. 3 and FIG. 5, an extension arm 54 extends from the free end 52 of the first elastic arm structure 50. For example, in this embodiment, the extension arm 54 is perpendicular to the first elastic arm structure 50, so that the extension arm 54 and the first elastic arm structure 50 together form an L-shaped structure, and the extension arm 54 abuts against the bottom surface 21 of the keycap 20. Hence, through the configuration of the extension arm 54, the area of the first elastic arm structure 50 for abutting against the bottom surface 21 of the keycap 20 can be increased, thereby further effectively eliminating or reducing the wobbling of the keycap 20.

As shown in FIG. 2 to FIG. 4, in this embodiment, the structures of the two first elastic arm structures 50 are the same, and the structure of each of the second elastic arm structures 55 is different from the structure of each of the first elastic arm structures 50. In this embodiment, the curved surface 522 of the protrusion 521 on the free end 52 of the first elastic arm structure 50 is an arced surface, and the curved surface 572 of the protrusion 571 on the free end 57 of the second elastic arm structure 55 is a semispherical surface. Therefore, the structure the second elastic arm structure 55 is different from the structure of the first elastic arm structure 50.

Figure 11:
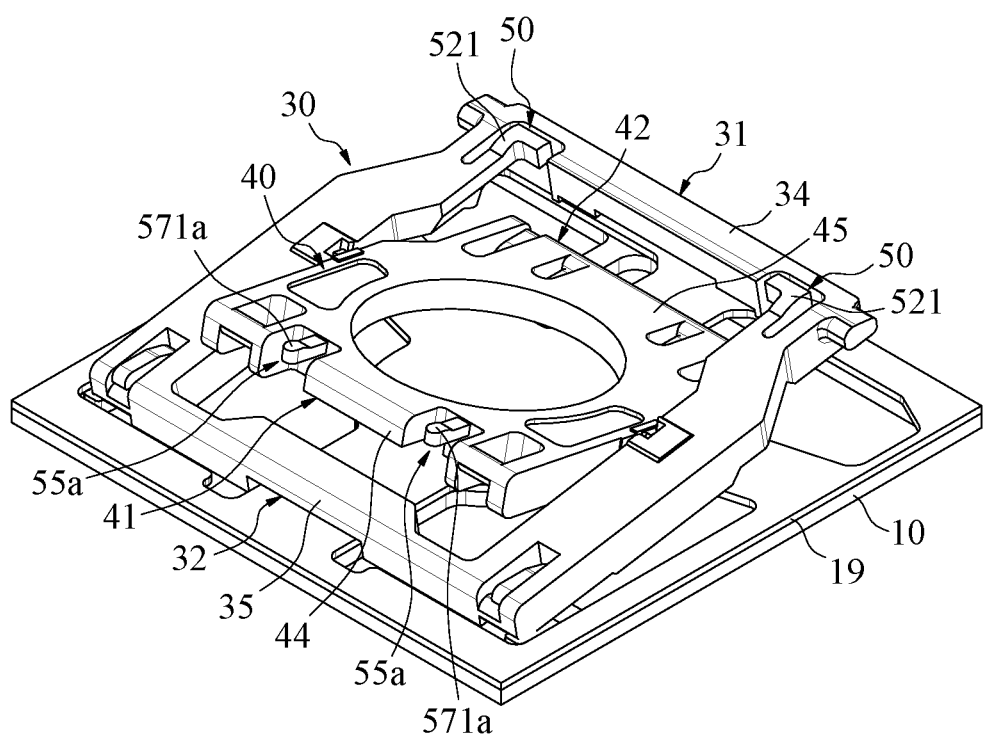
FIG. 11 illustrates a partial perspective view of a keyboard device according to a third embodiment of the instant disclosure.

However, the structure of the second elastic arm structure 55 may be the same as or similar to the structure of the first elastic arm structure 50. For example, both the protrusion 521 on the first elastic arm structure 50 and the protrusion 571 on the second elastic arm structure 55 may be arced structures, cone structures, ball structures, cylinder structures, or elongated rib structures. For instance, as shown in FIG. 10, in this embodiment, both the protrusion 521a on the first elastic arm structure 50a and the protrusion 571 on the second elastic arm structure 55 are semispherical structures, and thus the structure of the second elastic arm structure 55 is the same as or similar to the structure of the first elastic arm structure 50a. Alternatively, as shown in FIG. 11, in this embodiment, both the protrusion 521 on the first elastic arm structure 50 and the protrusion 571a on the second elastic arm structure 55a are arced structures, and thus the structure of the second elastic arm structure 55a is the same as or similar to the structure of the first elastic arm structure 50.

Figure 12:
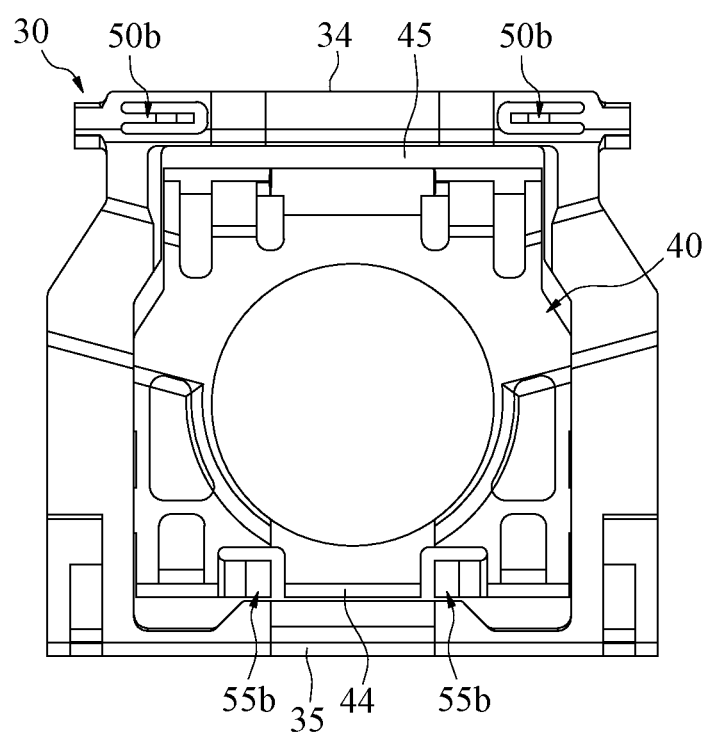
FIG. 12 illustrates a partial plan view of a keyboard device according to a fourth embodiment of the instant disclosure.

In some embodiments, the extension direction of the first elastic arm structure 50 may be perpendicular to or parallel to the extension direction of the first connection arm 34, and the extension direction of the second elastic arm structure 55 may be perpendicular to or parallel to the extension direction of the third connection arm 44. For example, as shown in FIG. 10, in this embodiment, the extension direction of the first elastic arm structure 50 is perpendicular to the extension direction of the first connection arm 34 of the first connection member 30, and the extension direction of the second elastic arm structure 55 is perpendicular to the extension direction of the third connection arm 44 of the second connection member 40. Alternatively, as shown in FIG. 12, in this embodiment, the extension direction of the first elastic arm structure 50b is parallel to the extension direction of the first connection arm 34 of the first connection member 30, and the extension direction of the second elastic arm structure 55b is parallel to the extension direction of the third connection arm 44 of the second connection member 40.

FIG. 13 to FIG. 16 illustrate a fifth embodiment of the instant disclosure. As shown in FIG. 13 to FIG. 16, the difference between this embodiment and the foregoing embodiment is that, in this embodiment, at least one first elastic arm member 60 is further connected to the second assembly side 32 of the first connection member 30, and at least one second elastic arm member 65 is further connected to the fourth assembly side 42 of the second connection member 40. In this embodiment, the number of the first elastic arm member 60 and the number of the second elastic arm member 65 are both two, the two first elastic arm members 60 are respectively adjacent to two opposite ends of the second assembly side 32, and the two second elastic arm members 65 are respectively adjacent to two opposite ends of the fourth assembly side 42.

Furthermore, the structure of the first elastic arm member 60 may be the same as or similar to the structure of the first elastic arm structure 50, and the structure of the second elastic arm member 65 may be the same as or similar to the structure of the second elastic arm structure 55. For example, in this embodiment, each of the first elastic arm members 60 is an elastic arm and comprises a connection portion 61 and a free portion 62 opposite to the connection portion 61, and the connection portion 61 is connected to the second assembly side 32 of the first connection member 30; likewise, each of the second elastic arm members 65 is an elastic arm and comprises a connection portion 66 and a free portion 67 opposite to the connection portion 66, and the connection portion 66 is connected to the fourth assembly side 42 of the second connection member 40.

Moreover, as shown in FIG. 13 to FIG. 16, when the second assembly side 32 of the first connection member 30 and the fourth assembly side 42 of the second connection member 40 are assembled to the keycap 20, the free portion 62 of each of the first elastic arm members 60 and the free portion 67 of each of the second elastic arm members 65 continuously abut against the top surface 11 of the substrate 10. Therefore, when sounds with certain frequencies exists in the circumstance where the keyboard device 1 is used and the components of the keyboard device 1 resonate with the certain frequency, the first elastic arm member 60 and the second elastic arm member 65 can prevent the collision between the substrate 10, the first connection member 30, and the second connection member 40 caused by the gaps therebetween. Therefore, the wobbling of the components can be eliminated or greatly reduced, thereby effectively reducing the noises generated by the resonance.

Figure 15:
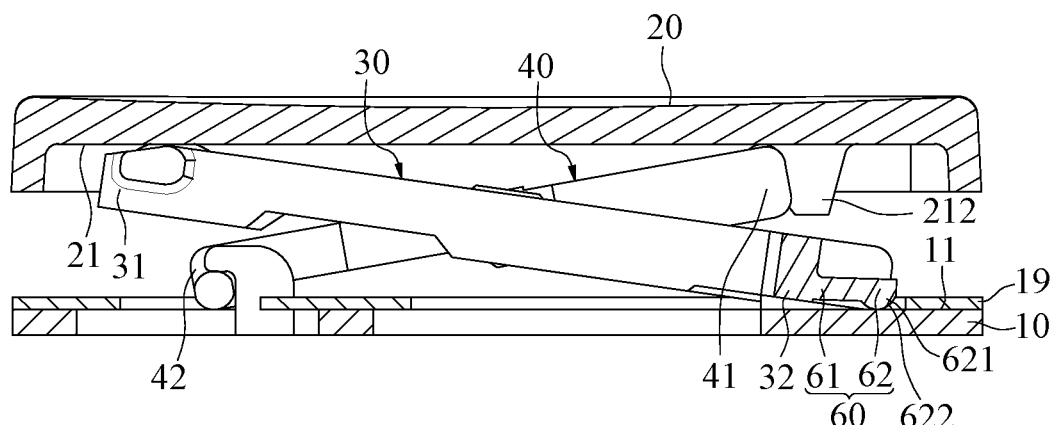
FIG. 15 illustrates a cross-sectional view along the line 15-15 shown in FIG. 14.
Figure 16:
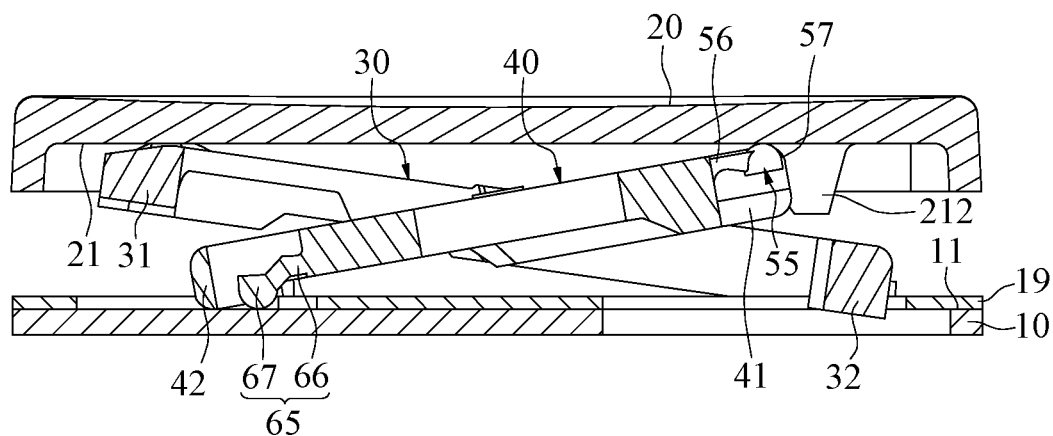
FIG. 16 illustrates a cross-sectional view along the line 16-16 shown in FIG. 14.

As shown in FIG. 15, the free portion 62 of the first elastic arm member 60 is further provided with a protrusion 621, the protrusion 621 has a curved surface 622, and the curved surface 622 abuts against the top surface 11 of the substrate 10. Therefore, during that the keycap 20 is moved downward or upward to be at different height positions to allow the swinging of the first elastic arm member 60, through the configuration of the curved surface 622 of the protrusion 621, the friction between the top surface 11 of the substrate 10 and the first elastic arm member 60 can be effectively reduced, thereby reducing the resistance generated upon the user presses the keycap 20. In some embodiments, the free portion 67 of each of the second elastic arm members 65 may be provided with a protrusion with a curved surface and the descriptions are not repeated here.

Figure 13:
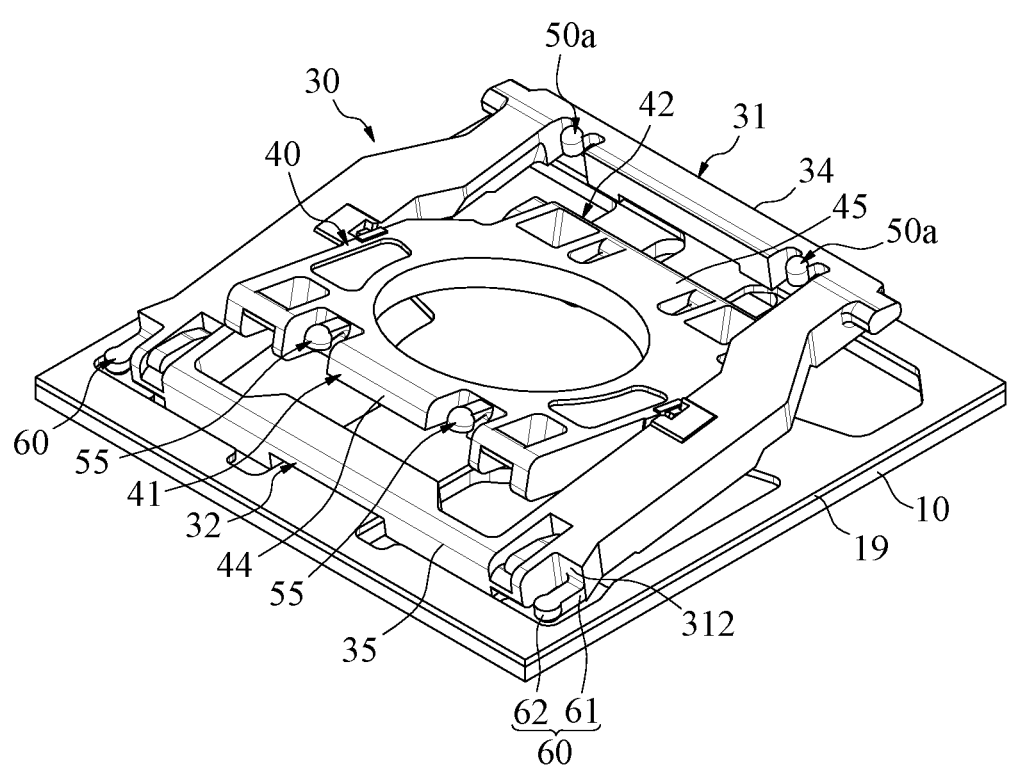
FIG. 13 illustrates a partial perspective view of a keyboard device according to a fifth embodiment of the instant disclosure.
Figure 14:
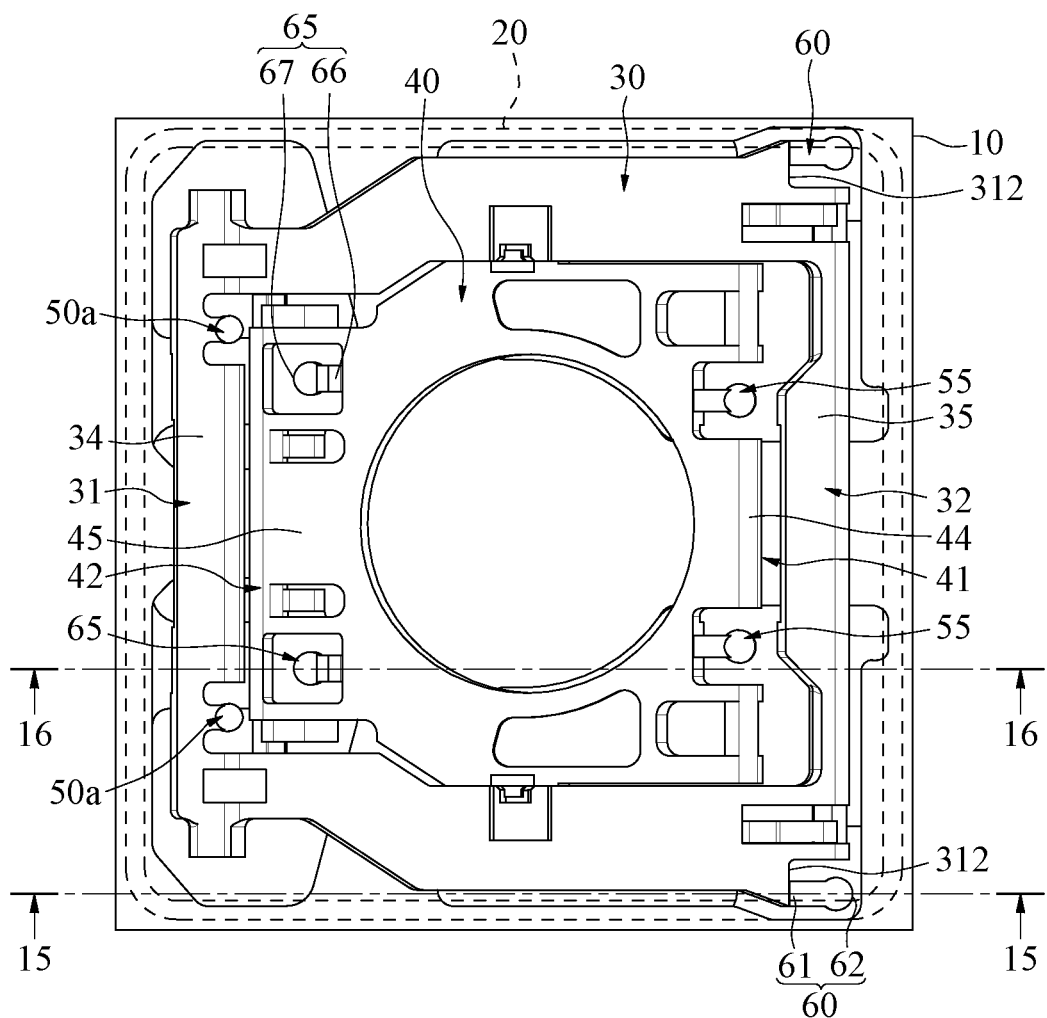
FIG. 14 illustrates a plan view of the keyboard device of the fifth embodiment of the instant disclosure.

As shown in FIG. 13 to FIG. 16, in this embodiment, the connection portion 61 of the first elastic arm member 60 is integrally connected to the second assembly side 32 of the first connection member 30. In other words, the first elastic arm member 60 and the first connection member 30 may be a structure integrally formed as a one-piece member, so that the manufacturing costs and numbers of the manufacturing steps of the keyboard device 1 can be reduced. Furthermore, as shown in FIG. 13 and FIG. 14, in this embodiment, the second assembly side 32 of the first connection member 30 has a groove 312, and the first elastic arm member 60 is in the groove 312, so that the usage amount of the material of the first connection member 30 can be further reduced. Moreover, the second elastic arm member 65 and the second connection member 40 may be a structure integrally formed as a one-piece member and the descriptions are not repeated here.

In some embodiments, the extension direction of the first elastic arm member 60 may be perpendicular to or parallel to the extension direction of the second connection arm 35 of the first connection member 30, and the extension direction of the second elastic arm member 65 may be perpendicular to or parallel to the extension direction of the fourth connection arm 45. For example, as shown in FIG. 14, in this embodiment, the extension direction of the first elastic arm member 60 is perpendicular to the extension direction of the second connection arm 35 of the first connection member 30, and the extension direction of the second elastic arm member 65 is perpendicular to the extension direction of the fourth connection arm 45 of the second connection member 40. Alternatively, in another embodiment, the extension direction of the first elastic arm member 60 may be the same as the extension direction of the first elastic arm structure 50b and thus parallel to the extension direction of the second connection arm 34, and the extension direction of the second elastic arm member 65 is the same as the extension direction of the second elastic arm structure 55b and thus parallel to the extension direction of the fourth connection arm 45.

Based on the above, in the keyboard device according to one or some embodiments of the instant disclosure, the first elastic arm structure is connected to the first assembly side of the first connection member and the free end of the first elastic arm structure abuts against the bottom surface of the keycap, or the first elastic arm member is connected to the second assembly side of the first connection member and the free portion of the first elastic arm member abuts against the top surface of the substrate. Therefore, when sounds with certain frequencies exists in the circumstance where the keyboard device is used (for example, the user plays music with a speaker to generate certain sounds), the first elastic arm structure or the first elastic arm member can eliminate or greatly reduce the wobbling of the components, thereby effectively reducing the noises generated by the resonance. Furthermore, upon the user presses the keycap, the keycap and the first connection member can be moved much more stably.

While the instant disclosure has been described by the way of example and in terms of the preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A keyboard device comprising:
 a substrate having a top surface, wherein the top surface has an assembling region;
 a keycap disposed above the assembling region, wherein the keycap has a bottom surface facing the assembling region;
 a first connection member connected between the keycap and the assembling region, wherein the first connection member comprises a first assembly side and a second assembly side opposite to the first assembly side, the first assembly side is pivotally connected to the bottom surface of the keycap, and the second assembly side is pivotally connected to the substrate; and
 a first elastic arm structure comprising a connection end and a free end opposite to the connection end, wherein the connection end is connected to the first assembly side, and the free end abuts against the bottom surface of the keycap;
 wherein the keycap is selectively moved with respect to the substrate and between a first height position and a second height position, when the keycap is not pressed and thus at the first height position, the free end of the first elastic arm structure elastically abuts against the bottom surface of the keycap.

2. The keyboard device according to claim 1, wherein the connection end of the first elastic arm structure is integrally connected to the first assembly side.

3. The keyboard device according to claim 1, wherein the first assembly side has a groove, and the first elastic arm structure is in the groove.

4. The keyboard device according to claim 1, further comprising:
 a second connection member connected between the keycap and the assembling region, wherein the second connection member comprises a third assembly side and a fourth assembly side opposite to the third assembly side, the third assembly side is pivotally connected to the bottom surface of the keycap, and the fourth assembly side is pivotally connected to the substrate; and
 a second elastic arm structure comprising another connection end and another free end opposite to the another connection end, wherein the another connection end is connected to the third assembly side, and the another free end abuts against the bottom surface of the keycap.

5. The keyboard device according to claim 4, wherein a first pivoting member is between the first assembly side and the second assembly side of the first connection member, a second pivoting member is between the third assembly side and the fourth assembly side of the second connection member, and the second pivoting member is pivotally connected to the first pivoting member.

6. The keyboard device according to claim 1, wherein the free end of the first elastic arm structure is further provided with a protrusion, the protrusion has a curved surface, and the curved surface abuts against the bottom surface of the keycap.

7. The keyboard device according to claim 6, wherein the curved surface is an arc surface or a semispherical surface.

8. The keyboard device according to claim 1, wherein an extension arm extends from the free end of the first elastic arm structure, and the extension arm abuts against the bottom surface of the keycap.

9. The keyboard device according to claim 8, wherein the extension arm is perpendicular to the first elastic arm structure.

10. The keyboard device according to claim 1, wherein the first elastic arm structure is arranged by a first inclination angle when the keycap is at the first height position, the first elastic arm structure is arranged by a second inclination angle when the keycap is at the second height position, and the second inclination angle is different from the first inclination angle.

11. The keyboard device according to claim 1, wherein the first assembly side has a first connection arm, the keyboard device comprises a plurality of the first elastic arm structures, and the first elastic arm structures are respectively adjacent to two opposite ends of the first connection arm.

12. The keyboard device according to claim 1, further comprising a first elastic arm member, wherein the first elastic arm member comprises a connection portion and a free portion opposite to the connection portion, the connection portion is connected to the second assembly side, and the free portion abuts against the top surface of the substrate.

* * * * *